United States Patent
Poh et al.

(10) Patent No.: US 7,758,425 B2
(45) Date of Patent: Jul. 20, 2010

(54) VIRTUAL CARD GAMING SYSTEM

(75) Inventors: Po Lian Poh, Ocean Park (SG); Lay Ngee Tay, Singapore (SG); Hwee Min Koh, Singapore (SG)

(73) Assignee: Weike (S) Pte Ltd, Singapore (SG)

( * ) Notice: Subject to any disclaimer, the term of this patent is extended or adjusted under 35 U.S.C. 154(b) by 1549 days.

(21) Appl. No.: 10/519,310

(22) PCT Filed: Jun. 21, 2004

(86) PCT No.: PCT/SG2004/000186

§ 371 (c)(1), (2), (4) Date: Feb. 1, 2005

(87) PCT Pub. No.: WO2005/123206

PCT Pub. Date: Dec. 29, 2005

(65) Prior Publication Data

US 2007/0149283 A1    Jun. 28, 2007

(51) Int. Cl.
*A63F 9/24* (2006.01)
*A63F 13/00* (2006.01)
*G06F 17/00* (2006.01)
*G06F 19/00* (2006.01)

(52) U.S. Cl. .......... 463/42; 273/139; 273/274; 273/292; 463/11; 463/16; 463/17; 463/25; 345/419; 345/619; 345/173

(58) Field of Classification Search ........ 463/10, 463/11, 32, 42
See application file for complete search history.

(56) References Cited

U.S. PATENT DOCUMENTS

| | | | |
|---|---|---|---|
| 1,527,929 A * | 2/1925 | Simons | 273/139 |
| 4,614,342 A * | 9/1986 | Takashima | 463/11 |
| 4,860,217 A * | 8/1989 | Sasaki et al. | 345/653 |
| 5,233,332 A * | 8/1993 | Watanabe et al. | 345/649 |
| 5,237,651 A * | 8/1993 | Randall | 715/776 |
| 5,295,199 A * | 3/1994 | Shino | 345/581 |

(Continued)

FOREIGN PATENT DOCUMENTS

EP    1363253 A2    11/2003

(Continued)

OTHER PUBLICATIONS

EP Application No. 04749211.1—Office Action dated May 27, 2008.

(Continued)

*Primary Examiner*—John M. Hotaling, II
*Assistant Examiner*—Paul A. D'Agostino
(74) *Attorney, Agent, or Firm*—Townsend and Townsend and Crew LLP

(57) ABSTRACT

A virtual card system provides a card game which is presented in a three-dimensional representation on monitor screens. The system allows human players to play the card game through the monitor screens. The monitor screen may be touch screens which allow the human players to input commands directly. The card game displayed on the touch screen is adapted for graphical manipulation in response to commands from a human player in real time, for instance to bend a card back at the corner to look on the underside.

23 Claims, 5 Drawing Sheets

U.S. PATENT DOCUMENTS

| | | | | |
|---|---|---|---|---|
| 5,333,255 | A * | 7/1994 | Damouth | 715/776 |
| 5,463,725 | A * | 10/1995 | Henckel et al. | 715/776 |
| 5,600,765 | A * | 2/1997 | Ando et al. | 345/668 |
| 5,669,817 | A * | 9/1997 | Tarantino | 463/13 |
| 5,770,533 | A * | 6/1998 | Franchi | 463/42 |
| 5,844,547 | A * | 12/1998 | Minakuchi et al. | 345/173 |
| 5,893,132 | A * | 4/1999 | Huffman et al. | 715/201 |
| 5,900,876 | A * | 5/1999 | Yagita et al. | 715/776 |
| 5,980,385 | A * | 11/1999 | Clapper, Jr. | 463/17 |
| 6,126,542 | A | 10/2000 | Fier | |
| 6,256,009 | B1 * | 7/2001 | Lui et al. | 345/684 |
| 6,259,436 | B1 * | 7/2001 | Moon et al. | 345/173 |
| 6,556,188 | B1 * | 4/2003 | Cordner | 345/173 |
| 6,628,310 | B1 * | 9/2003 | Hiura et al. | 715/776 |
| 6,634,946 | B1 * | 10/2003 | Bridgeman et al. | 463/28 |
| 6,877,746 | B1 * | 4/2005 | Herren et al. | 273/292 |
| 6,972,752 | B2 * | 12/2005 | Nako et al. | 345/173 |
| 7,081,882 | B2 * | 7/2006 | Sowden et al. | 345/156 |
| 7,255,642 | B2 * | 8/2007 | Sines et al. | 463/13 |
| 7,306,516 | B2 * | 12/2007 | Iosilevsky | 463/13 |
| 7,338,362 | B1 * | 3/2008 | Gallagher | 463/13 |
| 2001/0000118 | A1 * | 4/2001 | Sines et al. | 273/274 |
| 2001/0000778 | A1 * | 5/2001 | Sines et al. | 463/11 |
| 2002/0018051 | A1 * | 2/2002 | Singh | 345/173 |
| 2002/0119813 | A1 * | 8/2002 | Colin et al. | 463/11 |
| 2002/0173353 | A1 * | 11/2002 | Thomas | 463/17 |
| 2003/0048280 | A1 * | 3/2003 | Russell | 345/619 |
| 2003/0064767 | A1 * | 4/2003 | Brown | 463/12 |
| 2003/0112236 | A1 * | 6/2003 | Cordner | 345/419 |
| 2004/0053661 | A1 * | 3/2004 | Jones et al. | 463/16 |
| 2004/0092301 | A1 * | 5/2004 | Williams | 463/16 |
| 2004/0135316 | A1 * | 7/2004 | Lipscomb | 273/274 |
| 2005/0096117 | A1 * | 5/2005 | Katz et al. | 463/17 |
| 2005/0164789 | A1 * | 7/2005 | Nakamura et al. | 463/36 |
| 2005/0212214 | A1 * | 9/2005 | Pfeiffer et al. | 273/292 |
| 2005/0245307 | A1 * | 11/2005 | Gatto et al. | 463/16 |
| 2006/0084506 | A1 * | 4/2006 | Yoseloff et al. | 463/42 |
| 2006/0189384 | A1 * | 8/2006 | Crawford et al. | 463/31 |
| 2006/0205466 | A1 * | 9/2006 | White et al. | 463/11 |
| 2007/0004512 | A1 * | 1/2007 | Toyoda | 463/30 |
| 2007/0126186 | A1 * | 6/2007 | Crawford et al. | 273/459 |
| 2007/0218978 | A1 * | 9/2007 | Toyoda | 463/25 |
| 2008/0026826 | A1 * | 1/2008 | Groswirt | 463/25 |
| 2008/0108401 | A1 * | 5/2008 | Baerlocher et al. | 463/12 |
| 2008/0119257 | A1 * | 5/2008 | Stern et al. | 463/13 |

FOREIGN PATENT DOCUMENTS

| | | |
|---|---|---|
| EP | 04749211 | 7/2007 |
| EP | 04749211 | 8/2007 |
| WO | WO/98/36809 A1 | 8/1998 |
| WO | WO99/19037 | 10/1998 |
| WO | WO/01/72388 A1 | 10/2001 |
| WO | WO2004/028650 A1 | 4/2004 |

OTHER PUBLICATIONS

EP Application No. 04749211.1—Intention to Grant a European patent (Communication under Rule 71(3) EPC dated Oct. 31, 2008).

EP Application No. 04749211.1—Decision to Grant a European Patent dated Mar. 31, 2009.

Granted EP Patent No. EP1786531 B1 dated Apr. 1, 2009.

Philippine Application No. 1-2006-501433—Office Action dated Nov. 20, 2008.

People's Republic of China Application No. 200480040793.4—Office Action dated Mar. 6, 2009.

* cited by examiner

VIRTUAL CARD GAMING SYSTEM

FIELD OF INVENTION

The present invention relates broadly to a virtual card gaming system.

BACKGROUND

In a casino, many games played at live tables involve playing cards. Examples of such games include blackjack, poker, baccarat, pai-gow poker, Let-It-Ride™, Caribbean Stud™ and many others. Playing cards at live table games typically involves several operational requirements that are time-consuming. These operations include collecting, shuffling and dealing of the cards. Such operations require specially trained dealers to perform them. As a result, besides time losses in performing the operations, cost is incurred to train a dealer or hire a skilled dealer. Moreover, cheating may also be a problem. To prevent such cheating, constant camera surveillance or frequent patrols are required. Such measures further add to the cost incurred.

In order to overcome the above problems, the electronic gaming industry has created video game machines with electronic dealers, virtual cards and buttons to execute functions associated with the game played. Some prior art automates card play but uses real chips. Moreover, some virtual prior art requires a dealer who is skilled in card games, calculation and distribution of winnings, as it is incapable of one or more of such tasks.

Many prior art card gaming machines are designed without considering the player's needs. For example, many players appreciate interaction with the cards and chips. Such players enjoy the experiences of suspense and the thrill when live spectators cheer them on as they reveal a final card bit by bit at the card edges. Such players may also enjoy the freedom to manoeuvre chips into the betting area not just by looking at numbers or non-interactive computer images signifying virtual chips. Presently, no prior art card gaming machine can completely fulfil such needs.

Hence, it was with knowledge of the foregoing concerns that the present invention was conceived and has now been reduced to practice.

SUMMARY

According to one aspect of the present invention, there is provided a virtual card game system comprising:

a processing unit;

a plurality of player screens connected to the processing unit; and a touch sensing unit associated with each player screen, wherein playing cards displayed on the player screens are adapted for graphical manipulation in response to continuous touch movements detected through the touch sensing units, the manipulation comprising a three-dimensional representation so as to at least partially reveal the playing cards from a face down representation.

According to another aspect of the present invention, there is provided a method of graphically manipulating playing cards displayed on a touch screen in response to continuous touch movements detected through the touch screen, so as to at least partially reveal the playing cards from a face down representation, the method comprising:

generating an imaginary elongated member, the member being perpendicular to a direction of the continuous touch movements; and graphically mapping a portion of the playing cards, where the continuous touch movements acted thereon, on the imaginary elongated member.

BRIEF DESCRIPTION OF THE DRAWINGS

Embodiments of the invention will be better understood and readily apparent to one of ordinary skill in the art from the following written description, by way of example only and in conjunction with the drawings, in which.

DETAILED DESCRIPTION

In an exemplary embodiment, a virtual card system provides a card game which is presented in a three-dimensional representation on monitor screens. The system allows human players to play the card game through the monitor screens. The monitor screen may be touch screens which allow the human players to input commands directly. The card game displayed on the touch screen is adapted for graphical manipulation in response to commands from a human player in real time, for instance to bend a card back at the corner to look on the underside.

Figure 1:
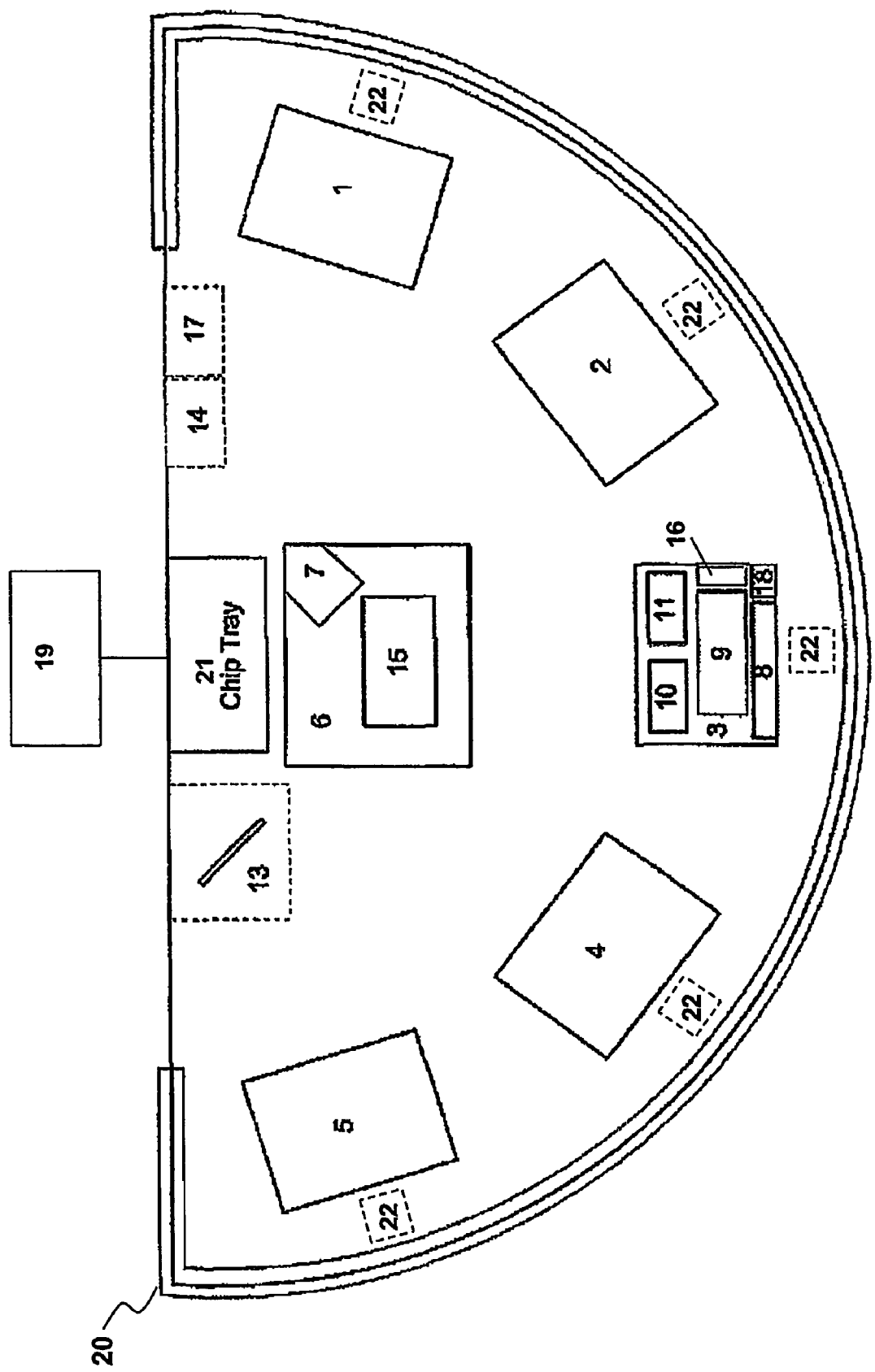
FIG. 1 is a top view of a system setup of an example of the present invention.

With reference to FIG. 1, a system set-up of the example described herein comprises a table 20, six monitors 1 to 6 incorporated with touch sensor, a central processor 19, a printer 17, a chip tray 21, a bill acceptor 14, a secure cashbox 13, and five smartcard reader devices 22. The detailed description of the example is as follows.

The table 20 may be shaped in a semicircular design with six rectangular hollow spaces cut out for mounting the six touch screen monitors 1 to 6. The table may provide compartments or spaces to place the central processor 19, the chip tray 21, the bill acceptor 14, the secure cashbox 13, smartcard reader devices 22 and one or more audio speakers (not shown in FIG. 1). In the example described herein, smartcard credit reader devices 22 may be positioned, one for each player touch screen monitor 1 to 5, near the human player's sitting or standing location. Furthermore, a standard casino tablecloth may cover the table 20 and leather trimmed cushions may cover the table edges. The table 20 may be set-up to look and feel like a traditional casino table. The difference from the real thing being all presentations and calculations of the game play may be done electronically by the central processor 19.

The touch screen monitors 1 to 6 may each comprise five basic components.

i) a touch sensor, for instance based on Capacitive, Resistive, Surface Acoustic Wave (SAW)/Grounded Acoustic Wave (GAW) or similar technologies;

ii) a monitor, for instance based on Cathode Ray Tube (CRT), Liquid Crystal Display (LCD), plasma or similar technologies having a display screen on which the sensor can be fitted;

iii) a controller for receiving inputs from the touch sensor and perform functions in response to the central processor 19;

iv) a software driver that allows the controller and central processor 19 to communicate and allows the controller to recognise input detected by the touch sensor.

The central processor 19 may be placed under the table 20 or outside of the table 20 as shown in FIG. 1. The central processor 19 may, for example, be a computer comprising a Processing Unit (PU), memory storage, video display unit with video Input/Outputs (I/O) to the video interface of the touch screen monitors 1 to 6, at least one audio output unit with audio I/O to an audio speaker (the speakers are not shown in FIG. 1), a computer operating system e.g. Windows™, Linux, Unix™ or the like, software drivers for all I/O peripherals, and serial/parallel ports for connection to peripherals such as a printer 17, smartcard reader devices 22, and Data I/O interfaces and Data I/O converters/splitters, where necessary.

A computer software program may be stored in the memory storage of the central processor 19. The program may organise display of all game components in a Graphical User Interface (GUI) on the touch screen monitors 1 to 6. The program may filter out relevant data for action, interpret the meaning of the data (after data conversion if necessary) sometimes with considerations from a previous event, present state or a predicted event, and act on the result of the interpretation. The data may come from I/O interfaces of all the devices/equipment connected to the program. Take the example of determining the position of a player's touch on a spot in the space of a graphic component on one of the touch screen monitors 1 to 6. A co-ordinate corresponding to each of the touch spots may be converted into a string of binary data by the controller of the touch screen. The data may then be transferred through serial connections from the controller to the central processor 19. The central processor 19 may extract the data, read the co-ordinates and act out the action associated with the touch spot.

The program may contain algorithms such as a random number controlled algorithm and a card bending algorithm. The random number controlled algorithm for example may use a Gaming Labs International (GLI) certified random number generator for doing electronic card shuffling. The card bending algorithm may be designed to provide a virtual realistic card flipping mechanism which will be described in detail later.

The program may also manage the game play, which may include setting timers for players to respond (where necessary), issuing, withdrawing, showing and/or shuffling electronic cards at the appropriate time, responding to a player's or dealer's request, ensuring the correct order of taking turns if the game requires players to take turns, calculating winnings and losses and distributing and withdrawing the virtual chips based on the credits purchased, won or lost. The program may also produce sound effects or music through the speakers in the correct order (synchronised with the display) and display the objects in the GUI in the correct order (synchronised with the sound) with the correct graphic animation (where necessary) at every instance just before, during or just after a game.

Another feature of the program may enable real-time transfer and processing of data between the touch screen monitors 1 to 6 and the central processor 19. For example, in a Windows™ Operating System platform, Windows™ Message Handling and recursive functions may be used for executing real-time operations. Moreover, the program may contain features to track transactions, do accounting, auditing and print reports for all the games held at the table 20.

The printer 17 may be an electronic device for printing receipts issued for every transaction. The printer 17 may comprise printing capabilities for instance based on inkjet/bubblejet, laser, dot matrix or similar technologies, memory storage, serial/parallel ports for connection to a computer such as the central processor 19, a software driver that allows the controller and connected computer operating system to communicate and help the controller to manage printing functions, and a controller for operating printing functions. The printer 17 may also be used for printing reports of selected or all of the records of transactions that take place at the table 20. An example of a transaction is the completion of a player's exchange of cash for chips, wherein a receipt indicating the cash exchanged for chips is printed for the player. In another example, a printer may be made available at each player touch screen monitor 1 to 5 e.g. for printing of transaction receipts, winning reports, etc. where the player desires.

The chip tray 21 may be used to hold chips. In the event that any card player produces real chips in exchange for virtual chips, the chip tray 21 is there for the dealer to hold these real chips.

The bill acceptor 14 may be an electronic device that verifies the authenticity of paper currency given by players in exchange of play credits, real chips or virtual chips. The bill acceptor 14 may include different types of sensors or verifying means such as light reflectors, magnetic imaging scanner and the like to verify the validity of the authenticity and scans the denomination of paper currency.

The secure cashbox 13 may be a cash depository for storing cash exchanged for chips by the players. The secure cashbox 13 is shaped as a box with at least one side that may be opened for the collection of bills or notes. Security features are found on the secure cashbox 13, for instance, using a padlock to lock the side of the box that may be opened.

The smartcard reader device 22 may be an electronic device that allows the use of smartcards with data storage capabilities. The smartcard reader device 22 reads/writes the credit value from/into the smartcard slotted therein.

In the described example, in particular, the smartcard reader devices 22 may be provided. Other electronic monetary systems, such as credit cards, debit cards, or the like, may also be provided for money or credit transaction for game play.

For other electronic monetary systems, an input panel to each player may be required for inputting player's account password or other authentication signature may require for crediting money in exchanged of virtual chips, or real chips for the game play. These other electronic monetary systems may further connect to the central processor 19 to aid in accounting/printing purposes and/or directly connected to printer 17 to print receipts for transactions. They may also be embedded with their own printer to directly print receipts for transactions.

The dealer touch screen monitor 6 is situated in the dealer's dealing area and displays the GUI for a human dealer to operate. Alternatively, the dealer touch screen monitor 6 displays the graphic interface of an automated electronic dealer. In this case, no human is required to operate from touch screen monitor 6. If a human dealer is desired, the dealer controls and manages the game from the GUI. There Is no need for the human dealer to be skilled In card handling as electronic cards are used. There is also no need for the dealer to distribute chips (unless otherwise preferred by players or the casino management staffs) and calculate the winnings of the card games. All the chips are electronic and the central processor 19 does the calculations of winnings.

Where a human dealer Is referred to, it does not necessarily mean he needs to have any card dealing skills or even is involved in dealing, electronically or otherwise. His role is generally that of a game controller, which may include card game promoter, table cashier, table master and/or the like, the system is designed to have a fully automatic mode, semi-automatic mode or a manual mode.

The GUI displayed on the touch screen monitor 6 may comprise a computer simulated card shoe 7 that holds multiple decks of virtual playing cards. The shuffling of cards may be done on the instructions of the computer software program based on the random number controlled algorithm. After shuffling, the shuffled cards may virtually be placed in the computer simulated shoe 7 shown on the touch screen monitor 6. The dealing of cards may be simulated according to a real live casino card game table with animations of the virtual cards travelling from the shoe 7 into the players' allocated card area 9 (a shown in card area 9 within touch screen monitor 3) or the dealer's allocated card area 15.

The player touch screen monitors 1 to 5 may be evenly situated close to the round edges of the semicircular table 20 so as to display the GUI for human players to operate.

The GUI displayed for a human player may comprise a credits area 8 showing the players existing credits, using virtual chips featuring graphics of actual chips used by a casino or standard pre-programmed chips graphics. As the touch screen monitors are flat, if all the virtual chips are stacked together, from the top view a player may not be able to count the number of existing chips. Hence, the actual credit value of the existing chips on hand appears in a numbers area 18. Also, as mentioned earlier, there may be an allocated card area 9 where dealt cards may be positioned and capable of manipulation by a human player through touch on the touch screen monitors. There may also be a bet area 10 where virtual chips placed as a bet may be positioned and a win area 11 where virtual chips won in a game may be shown before the chips are collected and stacked back to the credits area 8. Moreover, there may be a menu bar 16 that may be activated to appear on the display when needed. The menu bar 16 may contain hotkeys to the game play where players may access operations such as cancel bet, repeat bet and etc.

Before joining a game, a human player requires either real chips, a smartcard, cash or other electronic monetary means accepted for the game which the player may pass to a game dealer. The game dealer operates the GUI on the dealer's touch screen monitor 6 to send the corresponding credits to the players screen. Authentication using an iButton authentication device or other security authentication devices such as magnetic access cards, key switches or the like may be required to prevent unauthorised transactions. A printed receipt printed from printer 17 may be issued for every transaction and internal software may track all transactions for accounting and auditing purposes. If the player uses smartcards, credits may automatically be converted into virtual chips and shown on the players screen when the card is inserted into the smartcard reader device 22. The iButton authentication device may be a small, wearable computer, which may take the form of a key chain designed for secure corporate logins and personal uses.

During play, the human player may place bets by first touching a virtual chip of a certain value which the player desires to bet in the credits area 8 and then may touch the bet area 10. In this manner, one virtual chip may be deposited in the bet area 10. Subsequently, every touch in the bet area 10 may deposit another virtual chip of the same value into the bet area 10 unless the player selects another virtual chip of different value by touching on such a different virtual chip in his credits area 8. All betting may done during a prescribed betting time window provided by the control processor.

The game system may further provide other time windows to ensure orderly and smooth game play. When the betting time window is over, a dealing time window starts. During this time window, according to the game played, the virtual cards may be dealt like casino live table card games until all the cards are dealt After the dealing time window ends, a view cards time window starts, during the view cards time window, the players can manipulate the card. A first touch on the virtual card in the card area 9, followed by a drag towards the middle of the card, may show a three dimensional (3D) animation of the cards curling/bending upwards in the direction of the drag, similar to which a live player peeping or revealing real cards, with a sense of suspense. The drag refers to the finger of the player moving with constant contact on the touch screen monitor 1 to 5 after placing the first touch. The speed of curling or bending depends on the speed of the finger's drag movement. To greatly increase the atmosphere of game play, the animations may be coupled with synchronised sound effects played by the connected speakers. When the view cards time window lapses, all the virtual cards may be revealed automatically by the central processor 19. Depending on the game played, the time at which the time windows are activated may overlap one another. For instance, a player may view cards at the time of placing the bets in a game of poker. In this case, both view cards time window and betting time window may be activated.

After a won, lost or drawn game is completed, the winnings and losses may be calculated and collected by and awarded to the players through animations on the touch screen monitors 1 to 6. These animations imitate how real winnings and losses would be collected and awarded in a live table environment. A player may quit the table at anytime. If he or she Is not In the game, his or her credits may be refunded using real chips, credit tickets or credit back to a smartcard inserted in the smartcard reader devices 22.

Figure 2:
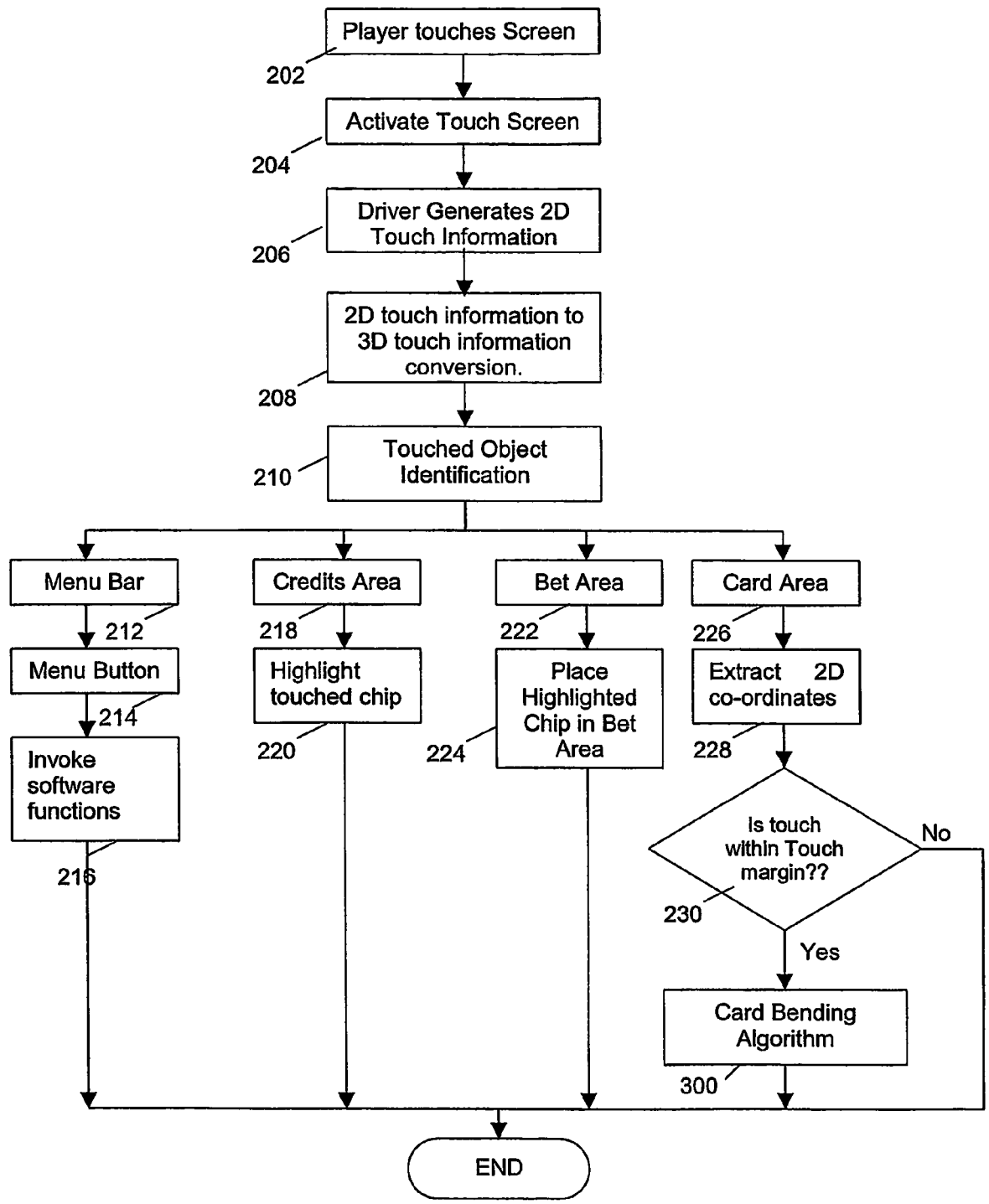
FIG. 2 is a flowchart showing the steps of the example of FIG. 1 in operation.

FIG. 2 exemplifies steps of a game play which involves a human player sitting before the touch screen monitor 1 of FIG. 1.

In step 202 at the start, the human player may touch the touch screen monitor 1. 1. The touch sensor of the touch screen monitor may detect the touch and trigger a response in the controller of the touch screen monitor 1 to activate the software touch screen driver at step 204.

In step 206, the driver may then generate two dimensional (2D) information of the touch. This information may refer to the co-ordinates of the contacted location on the touch screen monitor. The reference values of the co-ordinates may be extracted based on the horizontal and vertical axes.

The 2D information may then be transferred to the central processor 19 via the data I/O serial/parallel connections from the controller of the touch screen monitor 1 to the central processor 19. At step 208, the central processor 19 may convert the 2D touch information into 3D information. A known technique called Ray Picking, for instance, may be adopted for the conversion from 2D touch information to 3D touch information. During conversion, Ray Picking puts the 2D co-ordinates received from the touch screen monitor 1 through a view port transformation, followed by projection transformation, then through world transformation to get the resultant 3D co-ordinates.

After conversion, the central processor 19 may identify the object being touched at the location on the touch screen based on the 2D and/or 3D information (whichever is appropriate for the object) at step 210.

If the touched region is identified as the menu bar 16 in step 212, the central processor 19 may move on to identify the menu button within the menu bar 16 selected by the human player at step 214. Consequently, in step 216, the central processor 19 may invoke software functions to handle the one or more actions associated with the button clicked by the human player. For example, if a 'cancel bet' button is selected during the betting time window, all the bets placed from the time the betting time window is started to the time the 'cancel bet' button is clicked may be withdrawn.

If the touched region is identified as the credits area 8 in step 218, the touched virtual chip of a specific value within the credits area 8 may be highlighted at step 220.

Assuming a virtual chip had been highlighted following the steps of 202 to 210 and to 218 and 220. Now, if the touched region is identified as the bet area 10 in step 222, the highlighted virtual chip may be placed into the bet area 10 at step 224. Subsequently, each further touch on the bet area 10 may place one of the highlighted virtual chip(s) into the bet area 10.

If the touched region is identified as the card area 9 in step 226, in the next step 228, the central processor 19 may extract the 2D co-ordinates that was previously determined in step 206 and later transfer the co-ordinates into the memory storage of the central processor 19. The central processor 19 may check if the touch is within a prescribed margin of a virtual card. The card bending algorithm may be activated if the touch is within the margin at step 300. Otherwise the process ends until another touch is sensed by the system.

Figure 3:
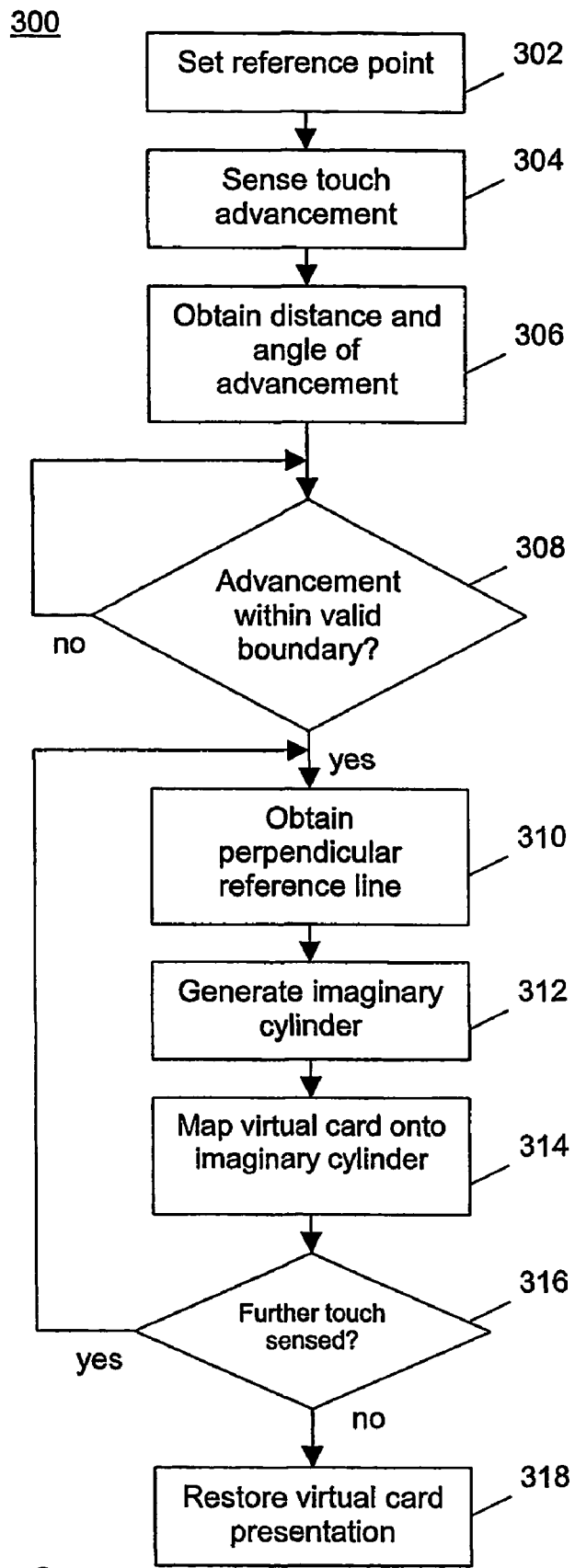
FIG. 3 is a flowchart showing the steps of a card bending algorithm utilised by the example of FIG. 1.
Figure 4:
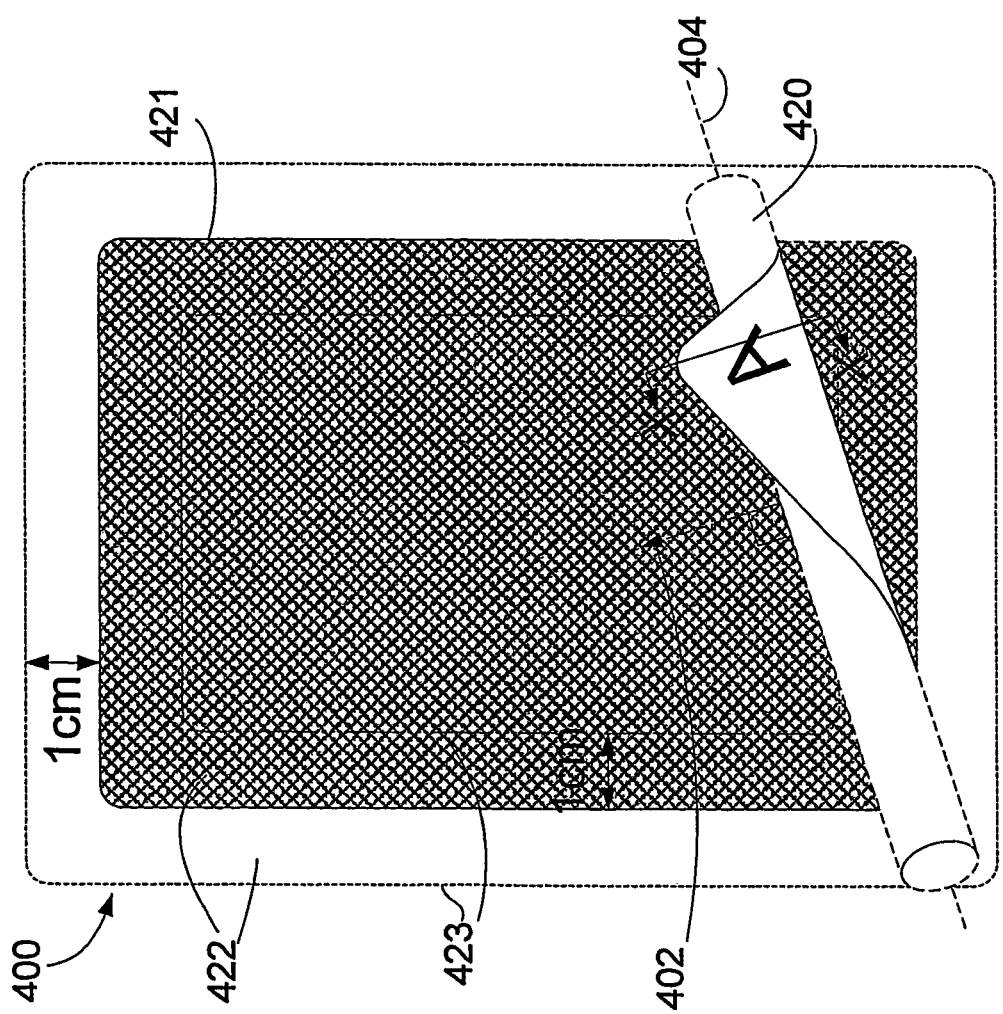
FIG. 4a is a schematic diagram showing a virtual card curling/bending.
FIG. 4b is a cross sectional view of the virtual card of FIG. 4a taken along line X-X.

With reference to FIG. 3 in conjunction with FIG. 4a and 4b, the description of the card bending algorithm at step 300 acting on a virtual card 400 is as follows.

At step 302, when a human player touches on a virtual card 400 within the card area 9, a reference point may be set on a co-ordinate correspond to the location on the touch screen where the human player touches on. The reference point may be a co-ordinate within a margin 422 of the virtual card 400. The margin 422 may be formed by two offset parameters 423 of a parameter 421 of the virtual card 400. In one implementation, the two offset parameters are offset by 1 cm. When the human player touches on the touch screen monitor 1 associating with the margin 422, a reference point is set.

Once a reference point is set at step 304, the touch sensor senses co-ordinates of any continuous touch among the surface of the virtual card 400 at step 304. For every co-ordinate the of the continuous touch that the touch sensor sensed, a corresponding angle and distance of the current co-ordinate relative to the previous sensed co-ordinate may be calculated at step 306. The corresponding angle and distance may be found by vector dot product.

At step 308, the angle of a continuous touch's co-ordinate may be used to determine whether the advancement of the continuous touch is within a valid boundary. The valid boundary may be defined when a reference point is set. The card bending algorithm may only bend the virtual card 400 if the continuous touch is advanced in an angle within the valid boundary. For instance, when the reference point is set at the right corner of the virtual card 400, the valid boundary for the continuous touch is any where within the virtual card 400, including along the side edges.

If the continuous touch is within a valid boundary, a reference line 404 perpendicular to a direction 402 of the continuous touch may be generated by vector cross product at step 310. Based on the reference line 404, an imaginary cylinder 420 is created at step 312. The imaginary cylinder 420 is invisible on the screen and may be used for mapping the virtual card 400. The imaginary cylinder 420 is in contact along the reference line 404 such that the surface of the virtual card 400 forms a tangent plane to the imaginary cylinder 420. The imaginary cylinder 420 may be configured to have a diameter such as, 1 cm.

When the touch sensor senses advancement on continuous touch, the imaginary cylinder 420 rolls towards the direction of the finger movement, and the portion of the virtual card 400 which the imaginary cylinder 420 rolled over is mapped on the imaginary cylinder 420 at step 314. Such mapping provides a virtual effect of a card bending for the game play. If the touch sensor detects further touch advancements and the portion of the virtual card 400 mapped on the imaginary cylinder 420 has reached a highest point 418 of the imaginary cylinder 420, the portion of the virtual card 420, the portion of the virtual card 400 further advances in the direction 402 without mapping on the imaginary cylinder 420.

During the course of the card bending algorithm, if the touch sensor does not sense any touch on the monitor's screen (the human player's finger leaves the monitor's screen), as check in step 316, the reference point may be erased and the virtual card 400 restore to the original presentation of the card 400 before touch. Such restoration may be a reverse algorithm of the card bending algorithm or simply replace the bent virtual card by a card with its original presentation as step 318.

Figure 5:
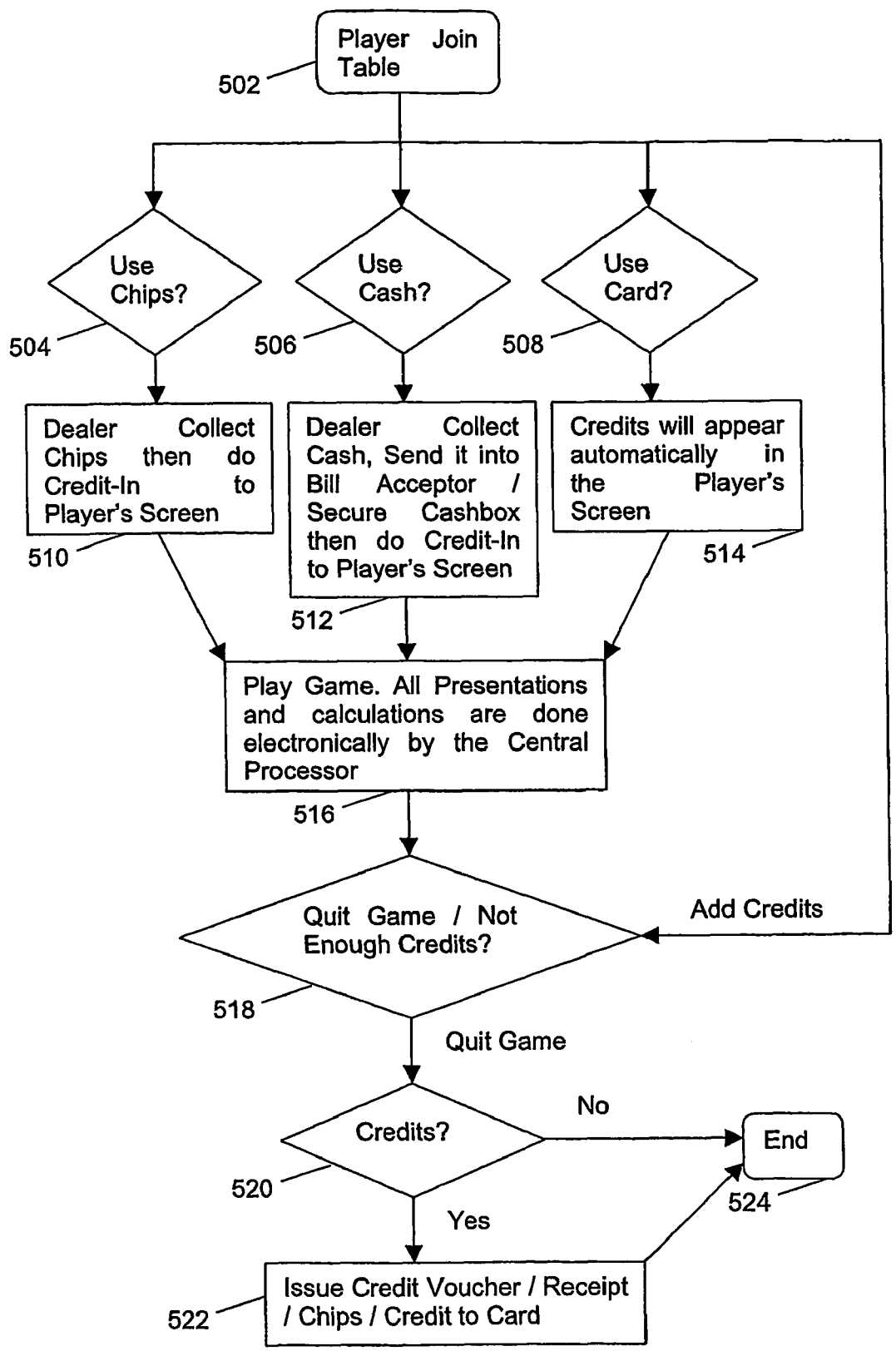
FIG. 5 is a flowchart showing the steps involved in the example from the start of a card game to the end.

Making reference to FIG. 5, a modified version of the card game Pok-Pek-Kow, herein named as 89 Poker, will now be described by way of example.

At step 502, a human player may join the table (20 in FIG. 1) to play 89 Poker.

Next, the player may choose between three options to acquire credits for the game. The three options may be, to use real chips at step 504, to use cash at step 506 and/or to use a smartcard at step 508. The player may also choose just to add credits and proceed directly to step 518.

If the player produces real chips, in step 510, a human dealer on duty at the table (20 in FIG. 1) may count and collect the player's chips from him and keep the chips in the chip tray (21 in FIG. 1). Thereafter, according to the value amount of real chips exchanged, the dealer credits the amount to an available player screen (i.e. any one of touch screen monitors 1 to 5 in FIG. 1) allocated to the player. The amount of credits may then appear as virtual chips in the player's screen.

If the player chooses to use cash to exchange for credits, in step 512 the dealer may collect the cash from the player and sends the cash to the bill acceptor (14 in FIG. 1) or secure cashbox (13 in FIG. 1). Thereafter, according to the amount of cash exchanged, the dealer may credit the amount to an available player screen (i.e. one of touch screen monitors 1 to 5 in FIG. 1) allocated to the player. The credited amount may then appear as virtual chips in the player's screen.

If the player chooses to use a smartcard, in step 514 there is nothing the dealer needs to do. The player may slot the smartcard into the smartcard reader device 22 and the credit existing in the smartcard may automatically appear in the player's screen.

Next, the game commences at step 516. All presentations on the touch screen monitors (1 to 6 in FIG. 1) and calculations may be done electronically by the central processor (19 in FIG. 19).

The game flow of 89 Poker is as follows.

There may be up to five players with the dealer as banker. The banker may be fully automated electronically or there may be a human dealer operating the dealer touch screen monitor (6 in FIG. 1). Multiple decks of cards may be used.

At the start, the cards are shuffled. Shuffling may be done electronically using the random number shuffling algorithm. Re-shuffling may be done when a pre-determined random end point is reached.

Next, the betting time window may open for the players to place their bets. The players may then place their bets according to the betting method as described previously for the betting time window.

After all bets are confirmed, the betting time window may close and the banker may start to distribute the virtual cards. The first card from a deck of cards may be dealt to Player 1, then the second card to Player 2 and so on to the last player and then to the banker. After two rounds of card distributing, the banker and players may have two cards each. The banker's cards may be dealt face-up but the players may have their cards face down with the option to have them face-up or down any time during the game. To show a card face-up, the player may drag with his/her fingers on the touch screen monitor (any one of 1 to 5 in FIG. 1) in the card area (9 in FIG. 1) until the virtual card is revealed. When the player is revealing a card, the player may choose to have sound effects of live spectators cheering them on as he/she reveals the card bit by bit. The sound effects may be played on the speakers connected to the central processor (19 in FIG. 1). All the cards may be dealt during the dealing time window.

In this example, the game system controlled by the central processor (19 in FIG. 1) may process the game rules and calculations based on the description as follows.

The points on all the cards may be summed with picture cards as 10 points. The last digit of the total points may be the score. E.g. 18 points may be considered as 8.

When distribution of cards is at two cards, any player with a Natural win, that is, 8 or 9, may win immediately unless the banker has equal or higher score. If the banker has 8 or 9, the game may stop. The score may then be compared with the banker. Players with higher scores may win, equal scores tie and lower score lose. If a player wins with a Pair, Flush or Pair with Flush, the win may be at different odds and the calculation of winnings different. If the banker has no Natural win, the game may continue. An odds table may be referred to when calculating the winnings. The odds table may be electronically coded into the memory storage of the central processor (19 in FIG. 1) and referred to when required.

During the third card distribution round, a player with the score of 0-3 calculated from his existing two cards may have to take a third card to add to his score. A player with a score of 4-7 may consider staying with this score or draw a third card. On the banker's side, the banker may have to draw a third card to add to his/her score if he/she has a score of 0-5. The banker may stay if he/she has a score of 6-7.

At three cards, a player with a score of 0-3 may immediately lose his/her bet he placed during the betting time window. Players' scores greater than 3 may then be compared with the banker's score. If a player has a higher score than the banker, the player may win, an equal score may be a tie and lower score loses. If a players wins with a 3-Of-A-Kind, 3 Card Flush or a 3-Of-A-Kind with Flush, the win may be at different winning odds and the calculation of the winnings may require reference to the odds table. For example, a player winning with 3-Of-A-Kind with Flush may have winning odds to triple the credits he bet during the betting time window.

Hence, in the above example, the processing rules for the Players of 89 Poker are as follow, 1) The game stops for individual player if it is a Natural 8 or 9;

2) The player draws a third card if his score is 0-3 at 2 cards;

3) The player considers to stay or draw a third card if his score is 4-7 at 2 cards;

4) The player automatically fold and loses his bets if his score is 0-3 at 3 cards;

5) Player winning calculations are made with reference to an odds table;

and the processing rules for the banker of 89 Poker are as follow,

1) All games stop if the banker has a Natural 8 or 9;

2) The banker must stand on 6 and draw a card if his score is 5 or less;

3) The banker only wins the player's bet.

Based on the banker processing rules, if the conditions are met, the system may automatically draw the cards for the banker.

Based on the player processing rules, if the conditions are met, the system may automatically draw the card for the player or prompt the player to draw a card. At the end of the third card distribution, all the players are to open their cards and the central processor (19 in FIG. 1) may compute the winnings. Once the winnings are calculated, the player's credits may be added/subtracted accordingly. Then the virtual cards may be collected and the system restart itself for the next round of the game. In the game, the peeping card feature governed by the card bending algorithm may be enabled once the players receive their cards and the view cards time window is started. In addition, in the example, the virtual cards may only be revealed after the view card time window time out or by using a designated key available on the touch screen to reveal the card immediately. The card may not be fully revealed at the time when the player is peeping his card during the view card time window and the activation period of the card bending algorithm.

At step 518, if a player does not have enough credits, the player may choose to quit and end the game at step 524 or may choose to add credits to carry on (if insufficient credits) at step 520 or the player stays and waits to play in the next round if the player has sufficient credits.

If the player wishes to add credits before or at the end of a game, depending on which mode of exchange for credits the player prefers, a credit voucher, receipt, chips or credit to card may be issued to him for the transaction at step 522.

In the foregoing manner, a system and method for electronic simulation of live table card games is disclosed. Only few embodiments are described. However, it may be apparent to one skilled in the art in view of this disclosure that numerous changes and/or modifications may be made without departing from the scope of the invention.

The invention claimed is:

1. A virtual card gaming system comprising:
a processing unit;
a plurality of player screens connected to the processing unit; and
a touch sensing unit associated with each player screen, wherein playing cards displayed on each player screen are adapted for graphical manipulation in response to continuous touch movements detected through the associated touch sensing unit, the manipulation comprising a three-dimensional representation so as to partially reveal the each playing cards from a face down representation such that a portion of an underside of the playing card in a face down representation is revealed in an advancing manner corresponding to an advancement of the continuous touch movements.

2. The system according to claim 1, wherein a trigger margin is provided on said each playing card and if the touch sensing unit senses said continuous touch movements following a touch within the trigger margin, the processing unit generates an imaginary elongated member for mapping said portion of the playing cards where the continuous touch movements are acted thereon, said imaginary elongated member being perpendicular to a direction of the continuous touch movements and such that when the portion of the playing card mapped onto the imaginary elongated member has reached a highest point of the imaginary elongated member during partially revealing of the playing card in the advancing manner, the portion of the playing card further advances in the direction of the continuous touch movements without mapping onto the imaginary elongated member.

3. The system as claimed in claim 1, wherein each player screen is divided into a set of functional areas, and the processor processes touches detected through the touch sensor units based on the functional area in which the touch was detected.

4. The system as claimed in claim 1, wherein the system further comprises a dealer screen connected to the processor unit for displaying shuffling of a stack of cards and dealing of cards to the player screens.

5. The system as claimed in claim 1, wherein the system further comprises a sound unit of providing an audio signal under the control of the processor unit, and the processor unit is capable of manipulating the audio signal based on signals from the touch sensor units.

6. The system as claimed in claim 1, wherein the system further comprises a payment unit, and the processor unit accounts transactions of each player.

7. The system as claimed in claim 1, wherein the system is operable under an automatic mode without a human controller.

8. The system as claimed in claim 1, wherein the system is operable under a semi-automatic mode with a human controller.

9. The system as claimed in claim 1, wherein the system is manually controllable by a human controller.

10. The system as claimed in claim 1, wherein the player screens are disposed substantially horizontal and each player screen is displaced at an angular displacement with respect to each other.

11. The system as claimed in claim 10, wherein the player screens are installed in a table structure with the player screens disposed on a tabletop.

12. The system according to claim 2, wherein the imaginary elongated member is an imaginary cylinder.

13. The system as claimed in claim 3, wherein the set of functional areas comprises a playing cards area.

14. The system as claimed in claim 3, wherein the set of functional areas comprises a chip holding area and a betting area.

15. The system as claimed in claim 14, wherein the processor instructs the removal of a chip from display in the chip holding area and display of the chip in the betting area as a result of a single touch detected in the chip holding area through the touch sensor unit, followed by a touch detected in the betting area.

16. The system as claimed in claim 15, wherein the processor instructs the removal of another chip of the same value from display in the chip holding area and display of the chip in the betting area as a result of a subsequent single touch detected in the betting area.

17. The system as claimed in claim 4, wherein a touch sensor unit associated with the dealer screen facilitates the dealer screen to function as a user interface to the processor unit.

18. The system as claimed in claim 4, wherein the dealer screen and the player screens are installed in a table structure with the dealer screen and the player screens disposed substantially horizontal on a tabletop, and each player screen is displaced at an angular displacement with respect to each other.

19. The system as claimed in claim 6, wherein the payment unit comprises one or more of a group comprising an electronic funds transfer machine, a notes reader and a secure cash box.

20. A computer readable storage medium having stored thereon code means for instructing a computer to execute a method for conducting a virtual card game, the method comprising displaying playing cards on a plurality of player screens, each player screen comprising a touch sensor unit associated therewith, and graphically manipulating the displayed cards in response to continuous touch movements detected through each touch sensor unit, the manipulation comprising a three-dimensional representation so as to partially reveal each playing card from a face down representation such that a portion of an underside of the playing card in a face down representation is revealed in an advancing manner corresponding to an advancement of the continuous touch movements.

21. A method of graphically manipulating playing cards displayed on a touch screen, the method comprising the step of: partially revealing each playing card from a face down representation in response to continuous touch movements detected through the touch screen such that a portion of an underside of the playing card in a face down representation is revealed in an advancing manner corresponding to an advancement of the continuous touch movements.

22. The method according to claim 21, wherein the imaginary elongated member is an imaginary cylinder.

23. The method as claimed in claim 21, further comprising:
providing a trigger margin on said each playing card;
generating an imaginary elongated member if the touch screen senses said continuous touch movements following a touch within the trigger margin, the imaginary elongated member being perpendicular to a direction of the continuous touch movements;
graphically mapping said portion of the playing cards where the continuous touch movements are acted thereon, on the imaginary elongated member such that when the portion of the playing card mapped onto the imaginary elongated member has reached a highest point of the imaginary elongated member during partially revealing of the playing card in the advancing manner, the portion of the playing card further advances I the direction of the continuous touch movements without mapping onto the imaginary elongated member.

* * * * *